United States Patent [19]

Sharp

[11] Patent Number: 5,095,737

[45] Date of Patent: * Mar. 17, 1992

[54] RIBBED STORAGE TANKS MADE OF METAL

[76] Inventor: Bruce R. Sharp, 4090 Ross Hill Ave., Cincinnati, Ohio 45229

[*] Notice: The portion of the term of this patent subsequent to Oct. 24, 2006 has been disclaimed.

[21] Appl. No.: 343,854

[22] Filed: Apr. 26, 1989

Related U.S. Application Data

[63] Continuation-in-part of Ser. No. 186,190, Jul. 5, 1988, Pat. No. 4,875,361.

[51] Int. Cl.⁵ ............................................. G01M 3/00
[52] U.S. Cl. ................................. 73/49.2; 220/445; 220/466
[58] Field of Search ............... 220/445, 71, 83, 5 A, 220/466, 469; 156/187; 73/49.2

[56] References Cited

U.S. PATENT DOCUMENTS

| | | | |
|---|---|---|---|
| 3,335,903 | 8/1967 | Anderson | 220/71 |
| 3,335,904 | 8/1967 | Anderson | 220/71 |
| 3,394,841 | 7/1968 | Anderson | 220/71 |
| 3,412,891 | 11/1968 | Bastone et al. | 220/5 A |
| 3,661,294 | 5/1972 | Pearson et al. | 220/71 |
| 4,039,708 | 8/1977 | Okada | 220/445 |
| 4,375,860 | 3/1983 | Greaves, Jr. | 220/71 |
| 4,537,328 | 8/1985 | Keesee et al. | 220/445 |
| 4,696,186 | 9/1987 | Sharp | 73/49.2 T |
| 4,708,015 | 11/1987 | Sharp | 73/49.2 T |
| 4,744,137 | 5/1988 | Palazzo | 73/49.2 X |
| 4,778,075 | 10/1988 | Wiegand et al. | 220/71 |
| 4,781,777 | 11/1988 | Pugnale et al. | 156/187 |
| 4,796,676 | 1/1989 | Hendershot et al. | 73/49.2 T |
| 4,825,687 | 5/1989 | Sharp | 220/444 |
| 4,859,262 | 8/1989 | Sharp | 73/49.2 T |
| 4,875,361 | 10/1989 | Sharp | 220/445 |

*Primary Examiner*—Tom Noland
*Assistant Examiner*—Craig Miller
*Attorney, Agent, or Firm*—Charles R. Wilson

[57] ABSTRACT

A method of making a storage tank comprises forming a cylindrical-shaped tank from thin gauge metal and adding spaced support ribs. In a preferred embodiment, an outer wall comprises of a series of sections which are at least partially separated from the tank's walls between each set of support ribs is provided. Each outer wall section is bonded to side walls of the ribs at a distance of less than about 90% of the height of the support ribs such that the ribs protrude from the outer surface of the storage tank.

4 Claims, 3 Drawing Sheets

RIBBED STORAGE TANKS MADE OF METAL

This is a continuation-in-part of "Double Walled Storage Tanks With Common Rib Supports", Ser. No. 07/186,190, filed July 5, 1988, now U.S. Pat. No. 4,875,361.

This invention relates to storage tanks. More particularly, the invention relates to ribbed underground storage tanks made from metal.

BACKGROUND OF THE INVENTION

Storage tanks used for the underground bulk storing of liquids are predominantly formed either from sheet metal or from fibrous reinforced resinous material. Such tanks typically hold up to about 50,000 gallons of liquid. The tanks must be sufficiently strong to withstand internal forces exerted by the weight of the liquid as well as normal external ground forces.

Underground storage ranks made from sheet metal have a cylindrical-shaped main body with flattened ends welded thereto. The thickness or gauge of sheet metal used will depend on the size of the tank, the greater the size the greater the requisite sheet metal thickness. It follows that the larger sized tanks are more expensive to build primarily because of increased raw material costs.

There are also presently used storage tanks made from fibrous reinforced resinous materials. These tanks as well are expensive to build, though primarily because of the labor intensive steps which are needed. The larger tanks, e.g. those having a capacity greater than about 500 gallons are ribbed. That is, a series of ribs extend around a cylindrical-shaped main body. The ribs are either added to the exterior of a pre-formed cylindrical-shaped main body or are formed simultaneously with the main body utilizing a removable mold. In either case, the ribs strengthen the tank.

Underground storage tanks made from metal or fibrous reinforced resinous material directly compete in the same market. Each type of tank has its advantages. However, each type of tank has one common disadvantage, i.e. each is expensive to build.

In accord with a need, there has been developed a new underground storage tank. The tank enjoys many of the benefits of known metal tanks, but is less expensive to build.

SUMMARY OF THE INVENTION

A method of building a ribbed storage tank from thin metal comprises the steps of (a) forming a cylindrical-shaped tank having end caps; (b) optionally sand-blasting spaced circumferentially extending bands on the tank's outer surface; (c) positioning spaced support ribs circumferentially around the tank and over those bands of the tank which have been sand blasted; (d) applying a layer of fibrous reinforcing material completely over each of the support ribs; and (e) applying a resinous material onto or with said reinforcing material. When cured an overlay of fibrous reinforced resinous material is bonded to the support ribs and tank to secure the support ribs thereto to provide a strengthened metal tank which is capable of withstanding external and internal load forces normally encountered.

DETAILED DESCRIPTION OF THE INVENTION

Figure 1:
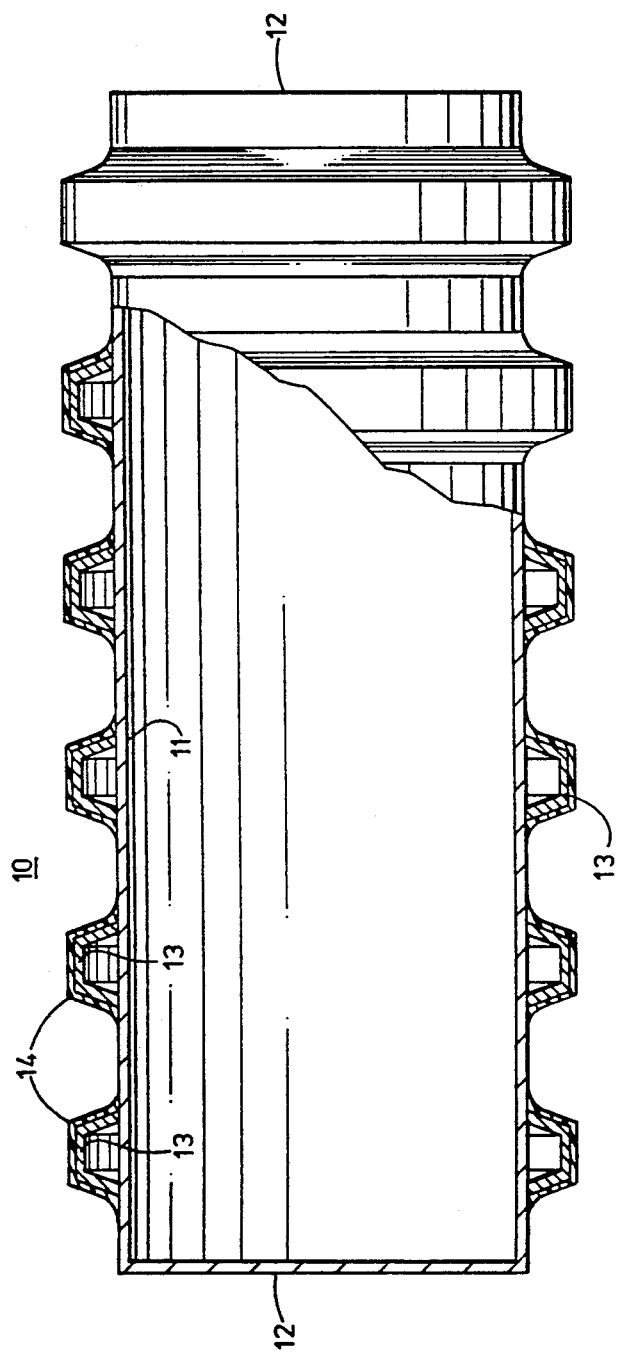
FIG. 1 is a side view of a ribbed storage tank of this invention having support ribs surrounding a metal inner tank.
Figure 2:
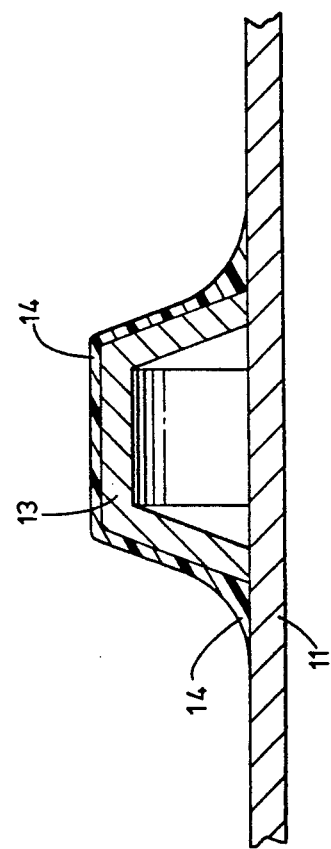
FIG. 2 is an enlarged sectional view of a support rib found on the storage tank of FIG. 1.

With reference to FIG. 1, there is shown a ribbed storage tank 10. The tank comprises cylindrical-shaped main body 11 and end caps 12. Main body 11 and end caps 12 are made of metal, preferably steel. In accord with this invention a thin sheet metal is used in fabricating main body 11. The metal's gauge is dependant on the size of tank being built. In all cases, however, the metal used is at least 25% thinner than normally required because of the tank's unique construction as discussed below.

Circumferentially extending support ribs 13 are positioned around tank body 11 and are secured thereto. The ribs are typically made from a cardboard core. The areas of the tank where the ribs are to be secured are preferably first sand blasted to white metal. An overlay 14 of fibrous reinforced resinous material is used to secure the ribs to the tank and form a rigid support rib. The overlay 14 is added by applying a layer of fibrous reinforcing material over each support rib and applying a resinous material onto or with the fibrous reinforcing material. When the resinous material is cured the overlay is rigid and securely bonded to the cardboard core and rank. The reinforcing material can be applied as a sheet of fiberglass, nylon or other synthetic fibrous material or in the form of chopped strands from a spray gun. In the latter case, the resinous material is applied substantially simultaneously and also in a spray form. Curing the resin occurs within minutes.

The ribs act as support so that the weight of the tank, including the contents therein are evenly distributed and add strength needed to withstand earth load stresses. Such ribs when properly formed and secured to the tank permit the use of a thinner than normal metal in building the tank without loss of tank strength.

The support ribs in FIG. 1 are hollow and have a trapezoid shape. They form open spaces when placed on tank body 11. The ribs can also be built from a foam mold such that the foam and a subsequently applied overlay act as rigid support ribs. Other rib structures made from pre-casted materials in various shapes can as well be used. Most importantly, the ribs are rigid and are secured to the tank.

A sufficient number of openings (not shown) are found in the storage tank 10 to allow for various access lines to the interior of the tank. For instance, a fill pipe, dispensing line and vent pipe can enter the storage tank at various points in the tank's surface. They can as well enter through one cover assembly.

The resultant ribbed storage tank has the structural strength of the conventional non-ribbed metal tanks made of thicker metal. The ribbed construction allows an ar least 25% metal thickness reduction and preferably a 50% to 75% metal thickness reduction without a loss of strength. The following table is used to show the correlation between tank size, tank diameter, minimum thickness metal according to UL 58 for steel underground storage tanks, and minimum thickness metal needed for tanks according to this invention with comparable strength.

| Tank Capacity Gallons | Diameter inches | Minimum Thickness (1) inches (gauge no) | Reduced Thickness (2) inches (gauge no) |
|---|---|---|---|
| up to 285 | 42 | 0.075 (14) | 0.54 (17) |
| 286-560 | 48 | 0.105 (12) | 0.075 (14) |
| 561-1,100 | 64 | 0.135 (10) | 0.105 (12) |
| 1,101-4,000 | 84 | 0.179 (7) | 0.135 (10) |
| 4,001-12,000 | 126 | 0.250 | 0.179 (7) |
| 12,001-20,000 | 144 | 0.313 | 0.275 |
| 20,001-50,000 | 144 | 0.375 | 0.281 |

Note
(1) Per UL 58 standard for steel underground storage tanks.
(2) For ribbed underground storage tanks made according to this invention.

Figure 3:
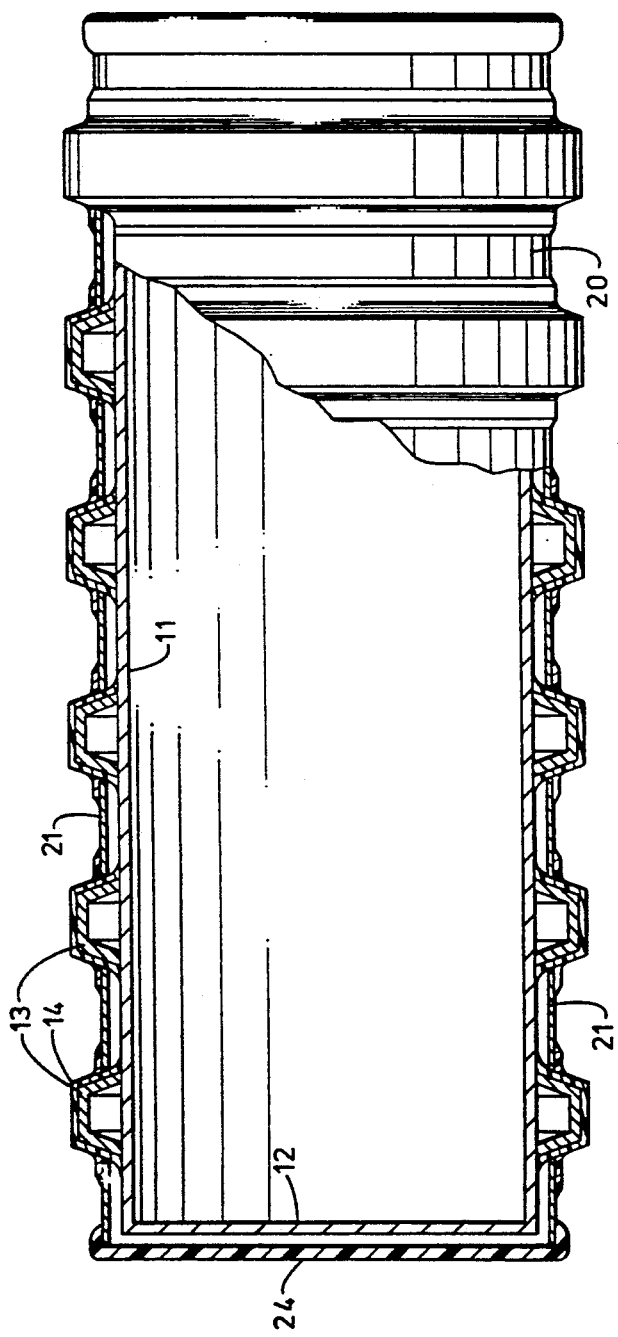
FIG. 3 is a side view of the ribbed storage tank of this invention wherein outer wall sections made from solid sheet material have been added.

In a preferred embodiment shown in FIG. 3, an outer wall 20 comprised of a series of solid sheet wall sections 21 is added to the single walled ribbed tank. Each section 21 is at least partially separated from the tank's walls. Examples of solid sheet materials used to form sections 21 include metal sheets and fiberglass/resin sheets. The metal sheet can be a thin gauge steel sheet with a diamond grid pattern on the surface which faces the inner tank. The fiberglass resin sheet preferably has a stucco appearance on the side facing the inner tank. It is, thus, preferred that the solid sheet material has an irregular surface on at least one side to ensure a seal is not formed by its contact with the inner tank walls. Because of manufacturing difficulties, portions of the outer wall sections may contact the inner tank wall 11. Such contact is not detrimental to the storage tank system's performance and is actually preferred provided the two walls remain at least partially separated.

Each wall section 21 is bonded to a side wall 22 of two adjacent support ribs 13. The sections are bonded at a distance of less than about 90% of the height of the support ribs. In effect, the top portions of the ribs protrude from the outer surface of the storage tank system. It has been found that constructing a double walled storage tank in this manner utilizes the support ribs to strengthen both the walls of the tank 10 and the outer wall 20. In effect, a double walled tank system is obtained in an efficient and economical fashion.

The bonding technique used to secure wall sections 21 to side walls 22 of the support ribs will depend on the materials of construction of the sections, per se, and the support rib surface covering. Preferably, the support ribs are secured to the inner tank by an overlay of a fibrous reinforced resinous material and the outer wall sections are made of fibrous reinforced resinous material. In this case, additional resinous material 23 is used for the bonding purpose.

In a preferred embodiment, the wall sections 21 are bonded to the side walls at a distance of less than about 75% of the height of the ribs. In a more preferred embodiment, each wall section 21 is bonded at a distance of from about 1% to about 50% of the height of the ribs.

Outer end caps 24 are preformed, preferably of fiberglass reinforced resinous material and positioned over the tank's ends. A space between the end caps is provided for. As shown, the end cap 24 is bonded to a support rib 13.

The shape of the outer wall 20 is such that it encases the end caps 12 and the surface areas between ribs 13 to form a closed space. The outer wall 20 itself is capable of containing any liquid which is stored in the storage tank and which has leaked therefrom. Most importantly, a double walled tank is built with only one set of ribs. The protruding ribs create an angle on the outer wall that greatly increases its strength. The result is a storage tank which is economically built with a minimum of labor intensive steps and which has sufficient strength without excessive wall thickness to meet or exceed mandated structural requirements. The walls of the storage tank are both able to withstand internal and external load forces encountered during use. Another feature of the storage tank herein is its secondary containment and monitor means capability.

Figure 5:
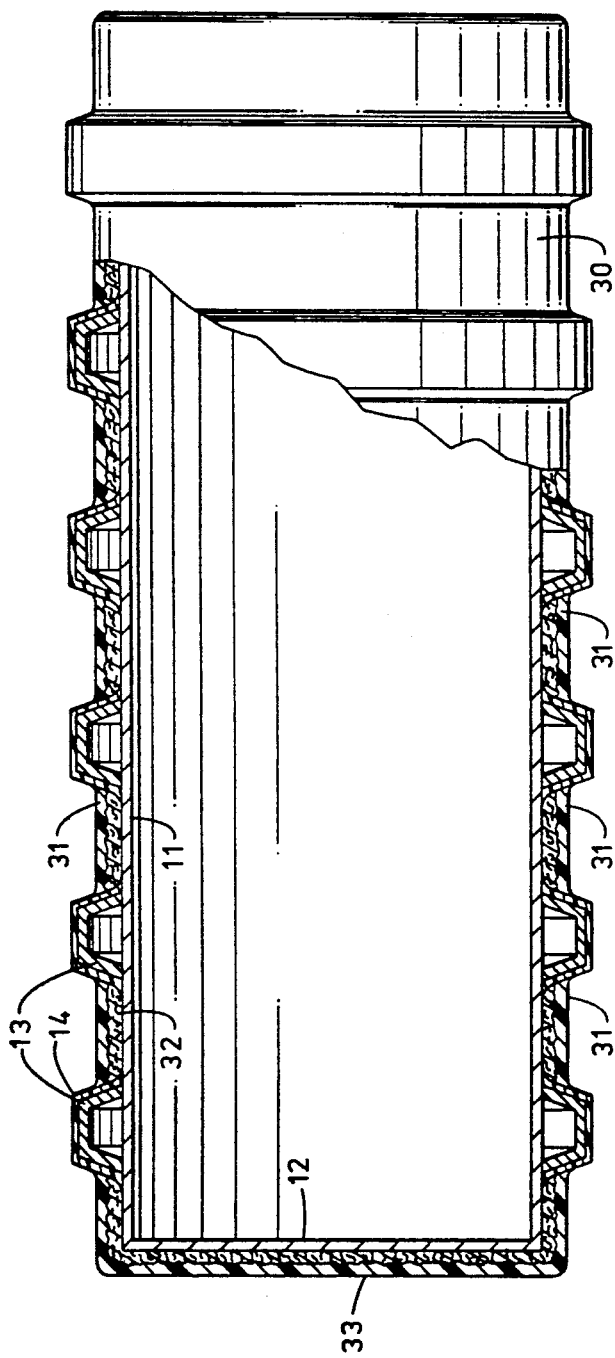
FIG. 5 is a side view of a ribbed storage tank of this invention illustrating outer wall sections made from fibrous reinforced resinous material.

Outer wall 30 shown in FIG. 5 is a fibrous reinforced resinous material. Wall sections 31 are formed in one method by first applying layers of fibrous reinforcing material 32, e.g. fiberglass on the outer surface of the tank 11 between the ribs and on the end caps 12. The fibrous reinforcing material can take on many different physical shapes and structures, variously referred to as mattings, nets, screens, meshes, and chopped strands. Examples of fibrous materials include fiberglass, nylon, and other synthetic fibrous materials. The fibrous material, if in sheet form, is laid onto the storage tank, as a continuous matting. The thickness of the fibrous material is great enough that a subsequently applied resinous material as discussed in the following paragraph will not be able to completely penetrate through it and seal to the inner tank 11.

Once the fibrous reinforcing material is applied, a resinous material is next applied to the reinforcing material and thereafter cured. Several different resinous materials are known for the purpose of reinforcing fibrous material. Such materials include polyesters, e.g. vinylesters, isophthalic polyesters, polyethylene, polypropylene, polyvinylchloride, polyurethane, and polyepoxide. The listed resinous materials used in the construction of the wall sections are not all inclusive, but only illustrative of some of the resinous materials which can be used.

Alternatively, the fibrous material is applied in the form of chopped strands along with the resinous materials described in the previous paragraph. In this embodiment, a separating material discussed in following paragraphs must be applied to the rank walls to keep the inner and outer walls separated. Thus, the chopped strand and resinous material are sprayed from separate nozzles of the same spray gun and the outer wall sections formed therefrom on the separating material as the resin cures. Necessarily, there will be some overlap of spray materials onto the top surface of the support ribs.

Still another method of forming the outer wall sections is by filament windings. In this method continuous reinforcing fibrous strands are impregnated with resinous material and then wrapped in a crossing pattern over the tank. A separating material is normally used in this method also.

Regardless of the method of forming outer wall 30, in all instances wall sections 31 are bonded to side walls 34 of the support ribs at less than 90% of the rib's height.

Figure 4:
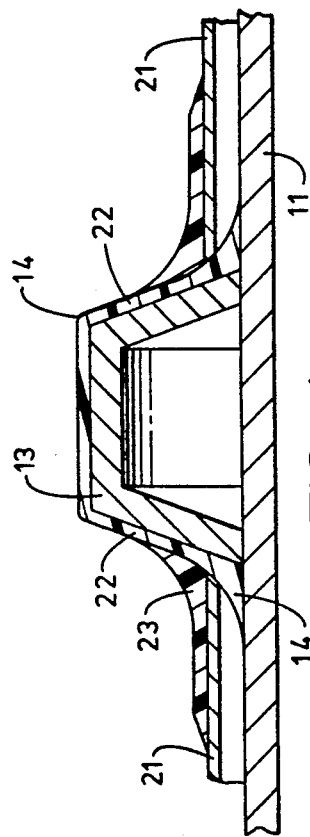
FIG. 4 is an enlarged sectional view of a support rib area found on the storage tank of FIG. 3.

The preferred bonding height is the same as discussed above with reference to FIGS. 3 and 4.

When needed, a separating material having an impervious outer planar surface is applied to the surface area on the inner tank's outer surface between ribs 13, including end caps 12. The purpose of the separating material is to ensure that the subsequently applied fibrous reinforcing material and resinous material which form the outer wall 30 comprised of the wall sections 31 and outer end caps 33 will not seal to the inner storage tank.

Separating materials include solid polymeric films as well as foraminous or porous materials which are sealed on at least one side. Many pliable or semi-rigid materials are usable. Examples of such material are polyethylene, jute, polyurethane foam, polyester foam, polyether foam, fiberglass matting, cotton matting, nylon matting, corrugated cardboard, and asbestos which range from about 0.01 inches to almost 1.5 inch in thickness. A heat seal or sealing material, e.g. a polymeric coating, is used on one surface of any foraminous materials when needed to prevent substantial saturation with a subsequently applied resinous material, Wax, which is subsequently heated and removed is also used as a separating material.

Figure 6:
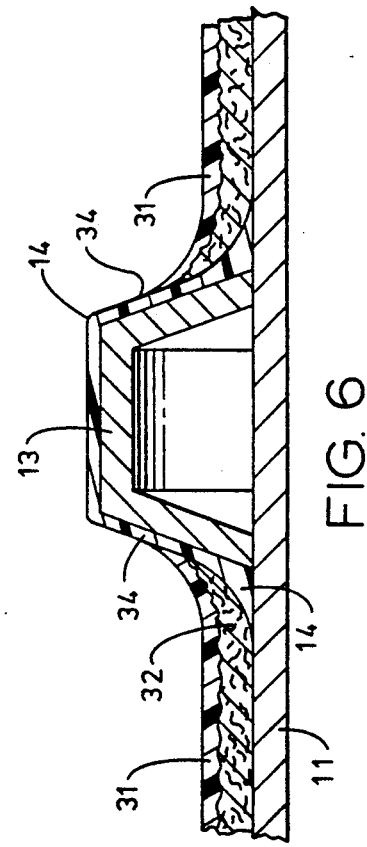
FIG. 6 is an enlarged sectional view of a support rib area found on the storage tank of FIG. 5.

In the embodiment of the invention discussed with reference to FIGS. 5 and 6 the continuous sheet of fibrous material serves the dual function of being a separating material and a part of an outer wall section. The sheet of material is about 0.05 inches to about 1.5 inches thick. A resinous material applied to the top surface of the fibrous material forms the outer wall sections and is bonded to the support ribs. Complete penetration of resin into the fibrous material is avoided. In effect the portion of the fibrous material sheet adjacent the tank is a separating material and the top surface portion together with the resinous material forms the outer wall sections.

Any of well known and commercially available monitor means can be used for monitoring the spaces between the ribs or the total containment space. For example, the closed space can be placed either under a non-atmospheric pressure, i.e. a positive or negative air pressure. Detection means associated with the closed space is capable of detecting any change in pressure resulting from a leak in the wall sections or the storage rank. Another detection means which can be used is an analyzer capable of detecting the liquid being stored. Thus, the detection means comprises the analyzer which is communication with the closed space. Still another detection means utilizes a probe which extends through an access tube so as to monitor for leakage at or near the bottom of the closed space. The probe is capable of detecting preselected liquids or gases. In this embodiment, leakage will ultimately seep to the bottom of the closed space and be detected.

All the leak detection means discussed above can be electronically linked with an alarm system to audibly or visually warn of a pre-ser significant change in the closed spaces. The leak detection means and secondary containment means allow for an early warning of a deterioration of either the primary or secondary containment means thereby permitting the necessary repair work to be done before any significant soil or water contamination has occurred.

While the invention has been described with respect to preferred embodiments, it is understood that various modifications may be made without departing from the spirit of the subject invention as defined by the appended claims. The ribs, themselves, can be any geometric shape desired including square-, rounded or trapezoidal-shaped. All obvious variations are within the scope of the claims.

What is claimed is:

1. A ribbed storage tank comprising a cylindrical-shaped main body made of thin metal, end caps attached to each end of the main body and a set of spaced rigid support ribs circumferentially extending around the cylindrical-shaped main body and secured thereto act as supports so that the weight of the storage tank is substantially evenly distributed and to provide a strengthened storage tank capable of withstanding external and internal load forces normally encountered by underground storage tanks.

2. The ribbed storage tank of claim 1 wherein overlaps of fibrous reinforced resinous material secure the support ribs to the cylindrical-shaped main body.

3. The ribbed storage tank of claim 1 wherein each support rib is comprised of a cardboard core having an overlay of fibrous reinforced resinous material.

4. The ribbed storage tank of claim 1 wherein each support rib is comprised of a foam core having an overlay of fibrous reinforced resinous material.

* * * * *